US009455916B2

(12) United States Patent
Chen et al.

(10) Patent No.: US 9,455,916 B2
(45) Date of Patent: Sep. 27, 2016

(54) METHOD AND SYSTEM FOR CHANGING PATH AND CONTROLLER THEREOF

(71) Applicant: Industrial Technology Research Institute, Hsinchu (TW)

(72) Inventors: Yen-Chiu Chen, Hsinchu (TW); Kwan-Yee Chen, Taoyuan County (TW); Shi-Wei Lee, Chiayi County (TW)

(73) Assignee: Industrial Technology Research Institute, Hsinchu (TW)

( * ) Notice: Subject to any disclaimer, the term of this patent is extended or adjusted under 35 U.S.C. 154(b) by 169 days.

(21) Appl. No.: 14/572,790

(22) Filed: Dec. 17, 2014

(65) Prior Publication Data
US 2016/0087894 A1 Mar. 24, 2016

(30) Foreign Application Priority Data

Sep. 22, 2014 (TW) .............................. 103132624 A (51) Int. Cl.
*H04L 12/28* (2006.01)
*H04L 12/801* (2013.01)
*H04L 12/701* (2013.01)
(Continued)

(52) U.S. Cl.
CPC .............. *H04L 47/12* (2013.01); *H04W 36/24* (2013.01)

(58) Field of Classification Search
CPC ..... H04L 47/12; H04L 47/122; H04L 47/10; H04L 47/00; H04L 45/22; H04L 45/24; H04L 45/42; H04L 45/54; H04L 45/745

USPC ......................................................... 370/237
See application file for complete search history.

(56) References Cited

U.S. PATENT DOCUMENTS 9,306,840 B2* 4/2016 Puttaswamy ........... H04L 45/42
2013/0070777 A1 3/2013 Hutchison et al.
(Continued)

FOREIGN PATENT DOCUMENTS

CN 103036781 4/2013
CN 103428031 12/2013
(Continued)

OTHER PUBLICATIONS

"Office Action of Taiwan Counterpart Application", issued on Feb. 19, 2016, p. 1-p. 4, in which the listed references were cited.
(Continued)

*Primary Examiner* — Ahmed Elallam
(74) *Attorney, Agent, or Firm* — Jianq Chyun IP Office (57) ABSTRACT

A method for changing a transmission path of packets transmitted from a first node to a second node in a software-defined network is provided. The method includes removing a flow entry corresponding to a first transmission path on a flow table of the first node after a plurality of first data packets intended to be transmitted to the second node are transmitted from the first node via relay nodes of the first transmission path. The method also includes transmitting a flush packet to the first node and setting the flush packet to be transmitted to the second node according to the first transmission path; and when the second node receives the flush packet and transmits a packet inquiry message corresponding to the flush packet to the controller, setting a flow entry corresponding to a second transmission path on a flow table of the second node.

19 Claims, 10 Drawing Sheets

(51) Int. Cl.
*H04L 12/717* (2013.01)
*H04L 12/741* (2013.01)
*H04L 12/751* (2013.01)
*H04W 36/24* (2009.01)

(56) References Cited

U.S. PATENT DOCUMENTS

| | | | |
|---|---|---|---|
| 2013/0132603 A1 | 5/2013 | Cohen et al. | |
| 2014/0064292 A1 | 3/2014 | Binetti et al. | |
| 2014/0098669 A1* | 4/2014 | Garg | H04L 47/12 370/235 |
| 2014/0133360 A1* | 5/2014 | Chiueh | H04L 41/12 370/256 |
| 2014/0192646 A1* | 7/2014 | Mir | H04L 43/0829 370/235 |
| 2014/0233385 A1 | 8/2014 | Beliveau | |
| 2014/0337674 A1* | 11/2014 | Ivancic | H04L 43/50 714/43 |
| 2014/0369348 A1* | 12/2014 | Zhang | H04L 45/121 370/389 |
| 2015/0180769 A1* | 6/2015 | Wang | H04L 45/38 370/236 |
| 2015/0249587 A1* | 9/2015 | Kozat | H04L 43/10 370/222 |
| 2015/0288388 A1* | 10/2015 | Kim | H04W 40/02 370/328 |
| 2015/0326476 A1* | 11/2015 | Ye | H04L 45/745 370/235 |
| 2015/0372902 A1* | 12/2015 | Giorgetti | H04L 45/64 370/219 |

FOREIGN PATENT DOCUMENTS

| | | |
|---|---|---|
| WO | 2012130264 | 10/2012 |
| WO | 2013078226 | 5/2013 |
| WO | 2013182031 | 12/2013 |

OTHER PUBLICATIONS

Srikanth Kandula, et al., "Dynamic Load Balancing Without Packet Reordering," ACM SIGCOMM Computer Communication Review, vol. 37, No. 2, Apr. 2007, pp. 51-62.

David Zats, et al., "DeTail: Reducing the Flow Completion Time Tail in Datacenter Networks," ACM SIGCOMM 2012 conference on Applications, technologies, architectures, and protocols for computer communication, Aug. 13, 2012, pp. 139-150.

Dang Duc Nguyen, et al., "TCP Multi-homing Support in Heterogeneous Networks," Proceedings of the International MultiConference of Engineers and Computer Scientists 2013, vol. II, IMECS 2013, Mar. 13-15, 2013, Hong Kong.

Theophilus Benson, et al., "MicroTE: Fine Grained Traffic Engineering for Data Centers," Seventh Conference on emerging Networking Experiments and Technologies archive, Article No. 8, Dec. 6, 2011.

Hilmi E. Egilmez, et al., "OpenQoS: An OpenFlow Controller Design for Multimedia Delivery with End-to-End Quality of Service over Software-Defined Networks," 2012 Asia-Pacific Signal & Information Processing Association Annual Summit and Conference (APSIPA ASC), Dec. 3-6, 2012, pp. 1-8.

Chung-Ming Huang, et al., "Packet Scheduling and Congestion Control Schemes for Multipath Datagram Congestion Control Protocol," The Computer Journal Advance Access, Jan. 12, 2014, pp. 1-16.

* cited by examiner

METHOD AND SYSTEM FOR CHANGING PATH AND CONTROLLER THEREOF

CROSS-REFERENCE TO RELATED APPLICATION

This application claims the priority benefit of Taiwan application no. 103132624, filed on Sep. 22, 2014. The entirety of the above-mentioned patent application is hereby incorporated by reference herein and made a part of this specification.

TECHNICAL FIELD

The disclosure relates to a method and a system for changing a transmission path of packets transmitted from a first node to a second node in a network, and a controller thereof.

BACKGROUND

With advancement in technologies and increasing demands of people for networking, network applications such as cloud service and big data have been developed accordingly. Traditionally, a switch includes both a control plane and a data plane. When a transmission path of data packets is confirmed, if a network state is in conditions of congestion or failure, the path cannot be instantly changed by the traditional switch. In other words, functions provided by the switch cannot be easily and dynamically changed based on demands of a user. Therefore, functions and behaviors of the network are usually restricted by the functions provided by the switch. As such, in order to add new functions and features to the existing network, purchasing a new machine with new functions is often the only option.

Figure 1:
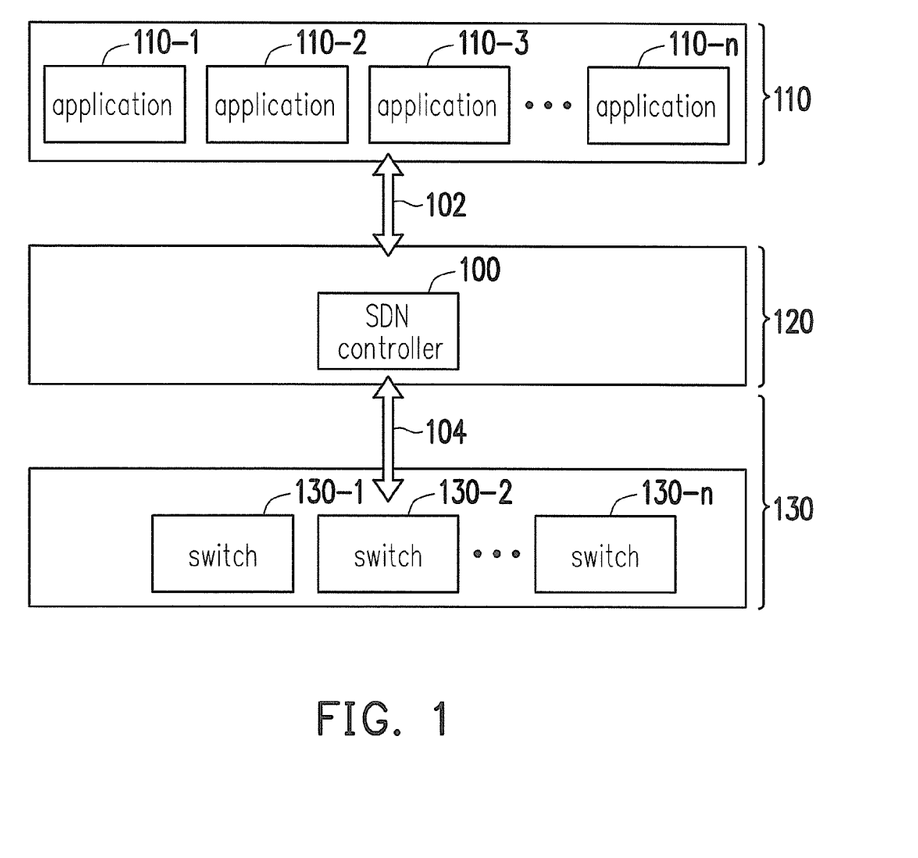
FIG. 1 illustrates an architecture of the software-defined network.

In recent years, for solving aforesaid problems, concepts and technologies of a software-defined network (SDN) have been proposed and received wide attention and research. FIG. 1 illustrates an architecture of the software-defined network. Referring to FIG. 1, in the architecture of the SDN, the network is divided into three planes, so as to separate the control plane of the network from the data plane. Said three planes include an application plane 110, a control plane 120 and a data plane 130. The application plane 110 allows the user to compose advanced network applications (e.g., applications 110-1 to 110-n) on a controller, and obtain data and services provided by the control plane 120 through a Northbound API 102 provided by a SDN controller 100. For instance, the user is able to obtain information regarding traffic of switches 130-1 to 130-n through the Northbound API 102, and perform a traffic load balance control according to such information. The control plane 120 provides basic network services, handles related information of the entire network, and communicates with the switches 130-1 to 130-n of the data plane 130 through a Southbound API 104, so as to control the behaviors of the entire network and a flow direction of the packets. Further, the data plane 130 is a part where the switches transfer the data packets. The plurality of switches 130-1 to 130-n are connected together to constitute a network topology, and the switches transfer the packets according to commands of the control plane.

Figure 2A:
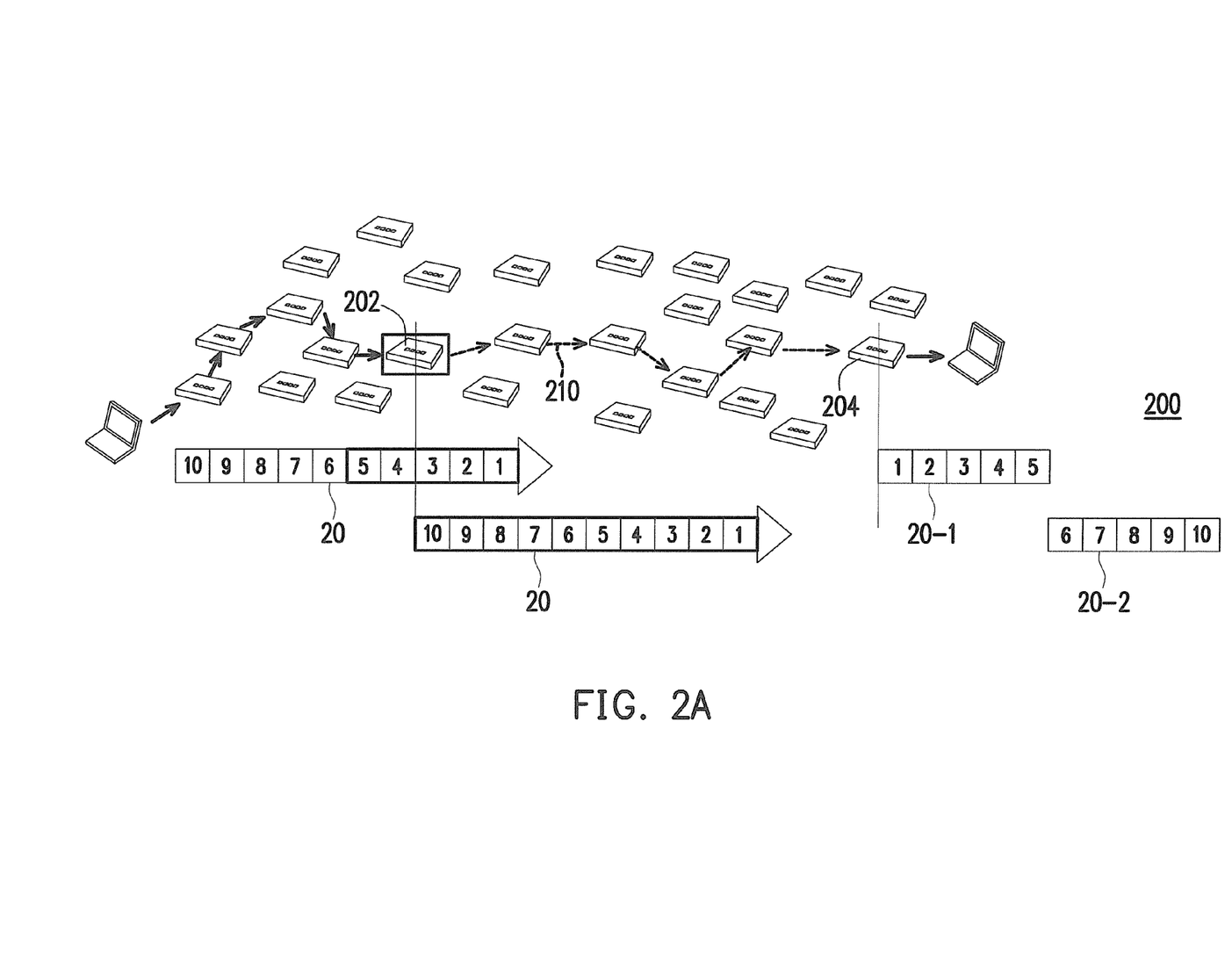
FIG. 2A to FIG. 2C are schematic diagrams illustrating the packet loss of original transmission path and the out-of-ordering packets at the receiving end after changing the transmission path of the data packets under the SDN environment.
Figure 2B:
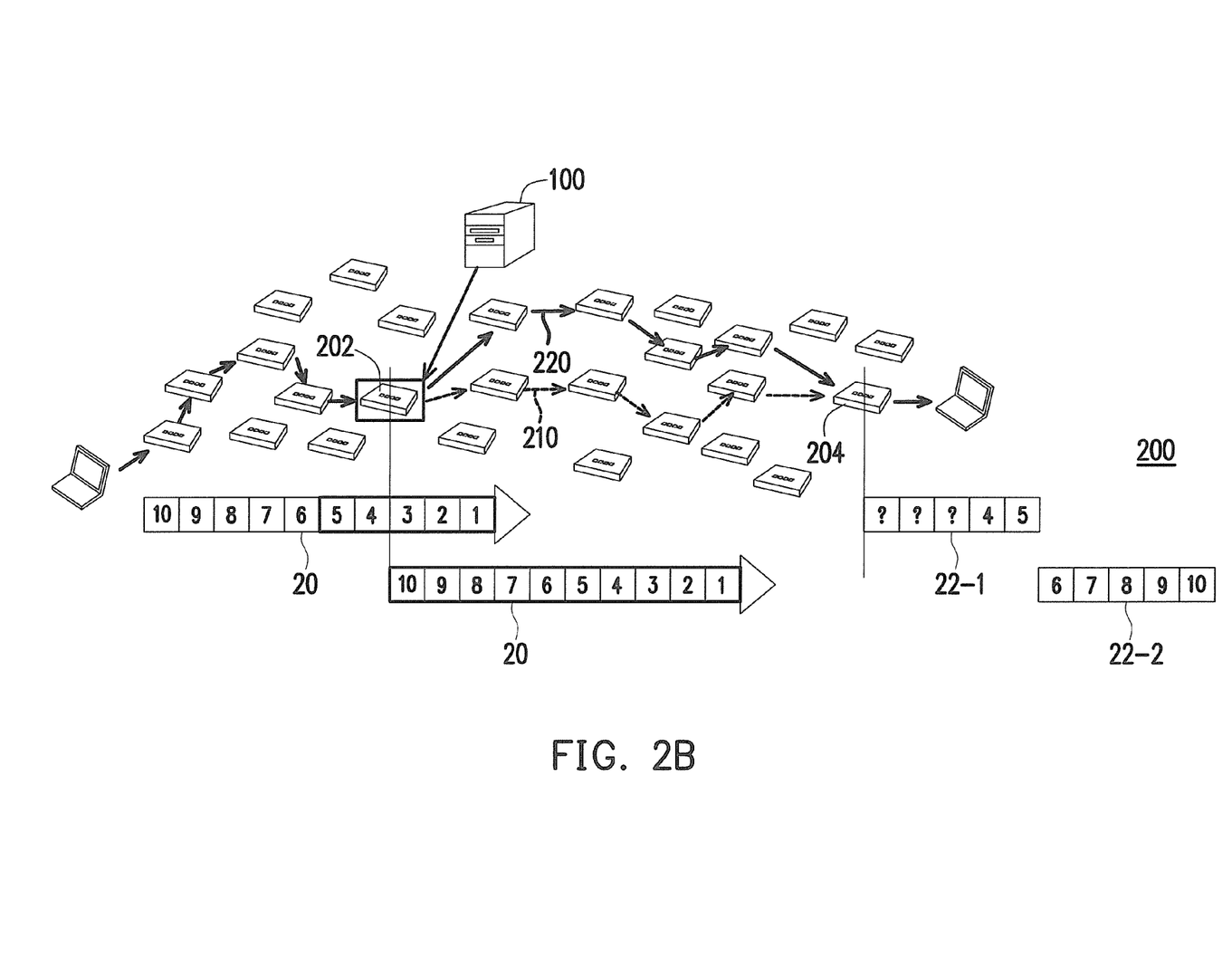
Figure 2C:
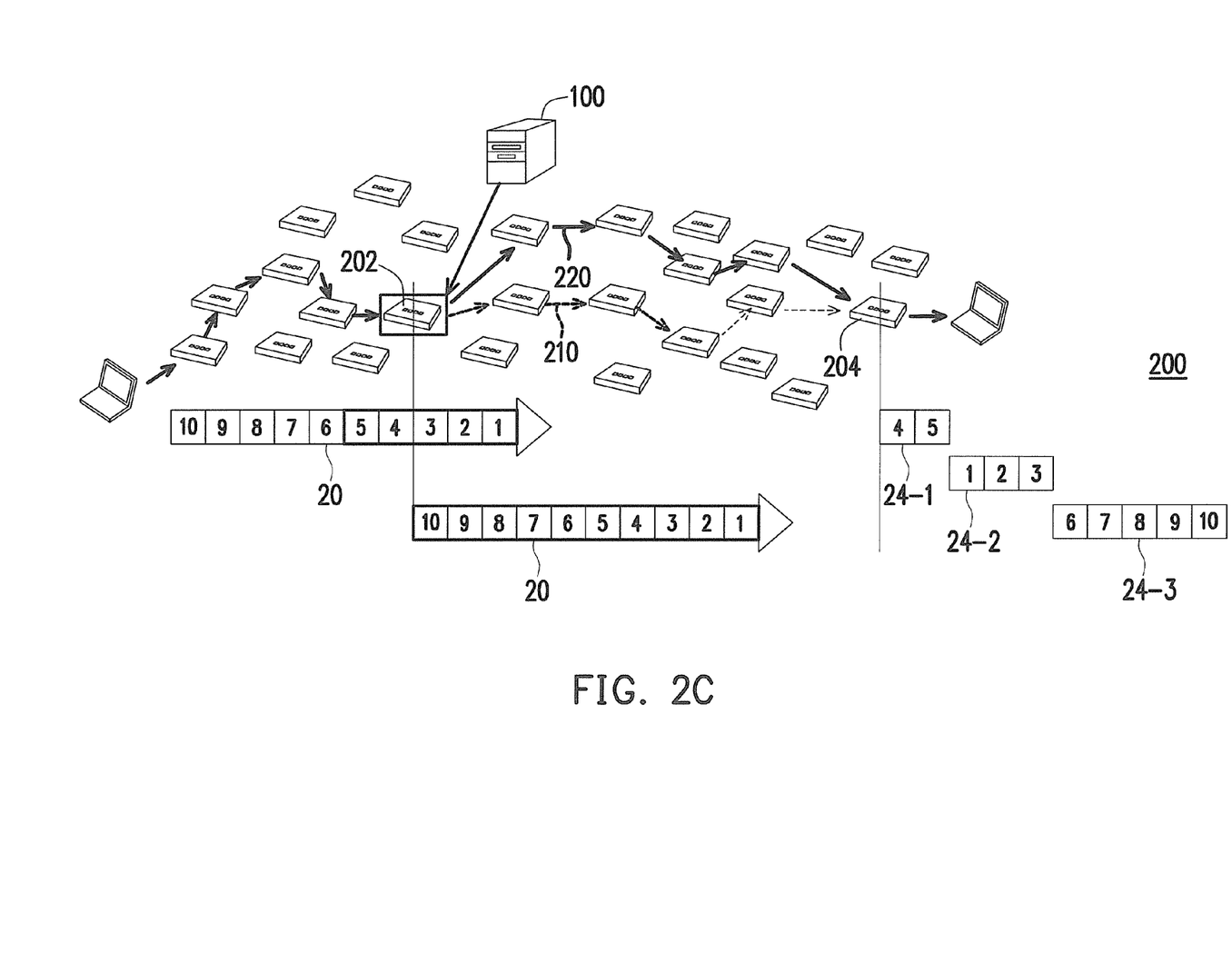

Under the SDN environment, data and packets are transmitted by a flow as the unit. In order to improve overall transmission performance, the SDN controller 100 is capable of adjusting the transmission path of the data packets according to the network state. However, after the transmission path of the data packets is changed, problems such packet loss of the original transmission path and out-of-ordering packets at a receiving end may occur. FIG. 2A to FIG. 2C are schematic diagrams illustrating the packet loss of original transmission path and the out-of-ordering packets at the receiving end after changing the transmission path of the data packets under the SDN environment. Referring to FIG. 2A, a software-defined network system 200 includes a plurality of network equipments (e.g., the network equipments may be a server device and a plurality of switches). In a normal condition as depicted in FIG. 2A, data packets 20 are transmitted by a plurality of relay nodes according to a path 210. For instance, the data packets 20 are transmitted according to Transmission Control Protocol (TCP), and a window size for transmitting the packets is 5. In other words, data packets 20-1 and data packets 20-2 are sequentially and completely transmitted from a first node 202 to a second node 204 through the path 210. Referring to FIG. 2B, if the SDN controller 100 changes the transmission path of the data packets to a path 220 when a network congestion is detected and a device at a transmitting end has not yet received a notification (which indicates that the data packets has been received) from a device at the receiving end (as shown in FIG. 2B), a congestion control at back end is triggered to reduce the window size for transmitting packets. For example, the window size is changed from 5 to 2. Accordingly, TCP performance may be reduced. In addition, a part of packets among data packets 22-1 transmitted to the second node 204 may be lost on the path 210 which is the path before changing path, resulting in a phenomenon of data packets loss. In other words, the data packets originally on an old path (i.e., the path 210) are not completely transmitted. Referring to FIG. 2C, when the SDN controller 100 intends to re-transmit the lost data packets (i.e., data packets 24-2) to the second node 204, because the data packets on a new path (i.e., the path 220) have already been transmitted to the second node 204 prior to the data packets on the old path (i.e., the path 210), the problem of the out-of-ordering data packets thus occurs.

Accordingly, it is one of the major subjects in the industry as how to prevent the data packets loss and the out-of-ordering data packets in the case where the transmission path of the packets is instantly adjusted according to the network state.

SUMMARY

The present disclosure is directed to a method and a system for changing path and a controller thereof, which are capable of instantly changing a path when the network state is in conditions of congestion or failure, and effectively preventing the problem of the packet loss on the old path and the problem of the out-of-ordering packets on the new and old paths caused by changing path.

The present disclosure provides a method for changing path, which is used to change a transmission path of packets transmitted from a first node to a second node in a network. The method includes removing a flow entry corresponding to a first transmission path on a flow table of the first node by the controller after a plurality of first data packets intended to be transmitted to the second node are transmitted from the first node by a plurality of relay nodes of the first transmission path according to the first transmission path. The network has a control plane and a data plane, and the controller is disposed in the control plane. The method also includes transmitting a flush packet to the first node and setting the flush packet to be transmitted to the second node according to the first transmission path by the controller. The method further includes setting a flow entry corresponding to a second transmission path on a flow table of the second node by the controller when the second node receives the flush packet and transmits a packet inquiry message corresponding to the flush packet to the controller.

The present disclosure provides a controller, which includes a management and setting module and a transceiving module. The management and setting module is configured to change a transmission path of packets transmitted from a first node to a second node in a network. The transceiving module is coupled to the management and setting module, and configured to receive and transmit packets and messages. After a plurality of first data packets intended to be transmitted to the second node are transmitted from the first node by a plurality of relay nodes of a first transmission path according to the first transmission path, the management and setting module is further configured to remove a flow entry corresponding to the first transmission path on a flow table of the first node. The network has a control plane and a data plane, and the controller is disposed in the control plane. The transceiving module is configured to transmit a flush packet to the first node and the management and setting module is further configured to set the flush packet to be transmitted to the second node according to the first transmission path. When the transceiving module receives the packet inquiry message corresponding to the flush packet from the second node, the management and setting module is further configured to set a flow entry corresponding to a second transmission path on a flow table of the second node.

The present disclosure provides a system for changing path, which includes a plurality of relay nodes and a controller. The controller is configured to change a transmission path of packets transmitted from a first node to a second node in a network. The first node and the second node each belongs to one of the relay nodes. After a plurality of first data packets intended to be transmitted to the second node are transmitted from the first node by a plurality of relay nodes of a first transmission path according to the first transmission path, the controller is further configured to remove a flow entry corresponding to the first transmission path on a flow table of the first node. The network has a control plane and a data plane, and the controller is disposed in the control plane. In addition, the controller is further configured to transmit a flush packet to the first node, and set the flush packet to be transmitted to the second node according to the first transmission path. When the controller receives the packet inquiry message corresponding to the flush packet from the second node, the controller sets a flow entry corresponding to a second transmission path on a flow table of the second node.

Based on the above, the method and the system for changing path and the controller thereof are capable of distinguishing the new packets from the old packets on the new and old paths by transmitting a flush packet, so as to effectively preventing the problem of the packet loss and the problem of the out-of-ordering packets.

To make the above features and advantages of the present disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In order to improve performance for processing and transmitting the data packets in the entire network, the present disclosure uses a specific flush packet to prevent the data packets changed to the new path from remaining on the old path, so as to effectively preventing the problem of the packet loss on the old path and the problem of the out-of-ordering packets on the new and old paths.

Figure 3:
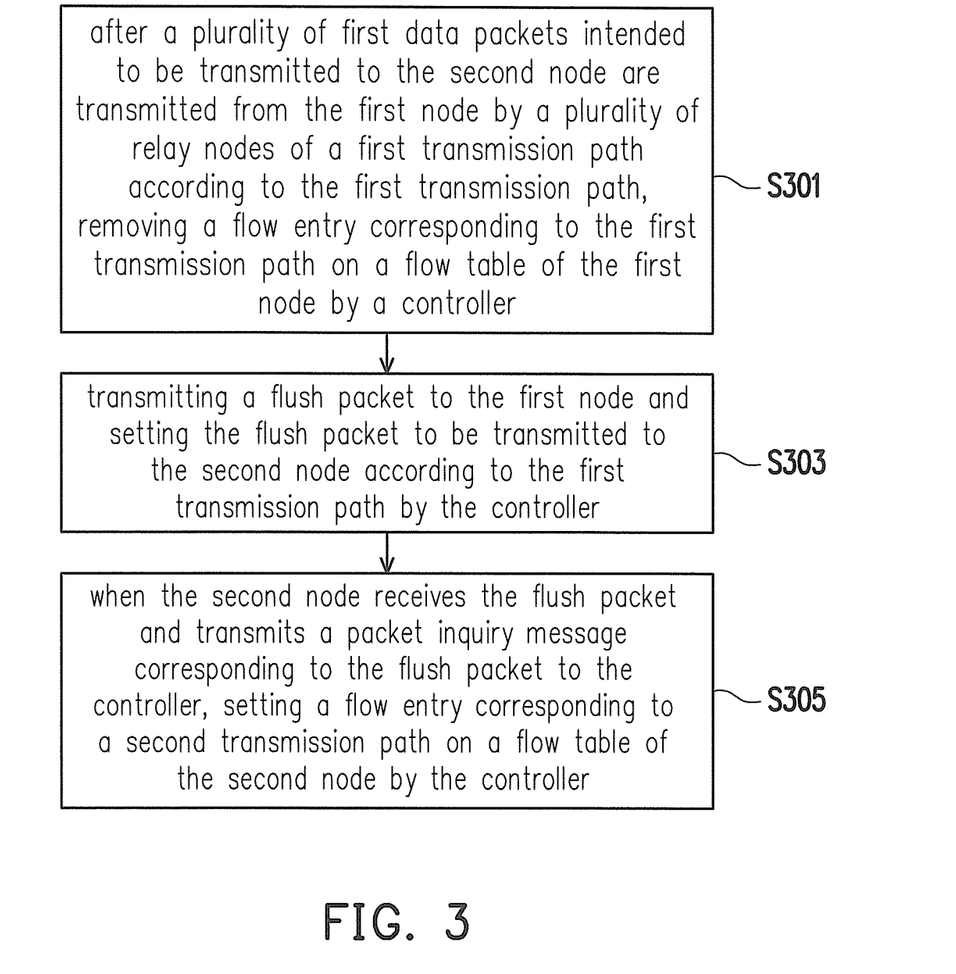
FIG. 3 is a flowchart illustrating a method for changing path according the present disclosure.

FIG. 3 is a flowchart illustrating a method for changing path according the present disclosure.

Referring to FIG. 3, a method for changing path is provided according to the present exemplary embodiment of the present disclosure, and said method is used to change a transmission path of packets transmitted from a first node to a second node in a network. The method includes: after a plurality of first data packets intended to be transmitted to the second node are transmitted from the first node by a plurality of relay nodes of a first transmission path according to the first transmission path, removing a flow entry corresponding to the first transmission path on a flow table of the first node by a controller (S301). The method further includes: transmitting a flush packet to the first node and setting the flush packet to be transmitted to the second node according to the first transmission path by the controller (S303); and when the second node receives the flush packet and transmits a packet inquiry message corresponding to the flush packet to the controller, setting a flow entry corresponding to a second transmission path on a flow table of the second node by the controller (S305). Several exemplary embodiments are described below for better understanding of the present disclosure.

First Exemplary Embodiment

Figure 4:
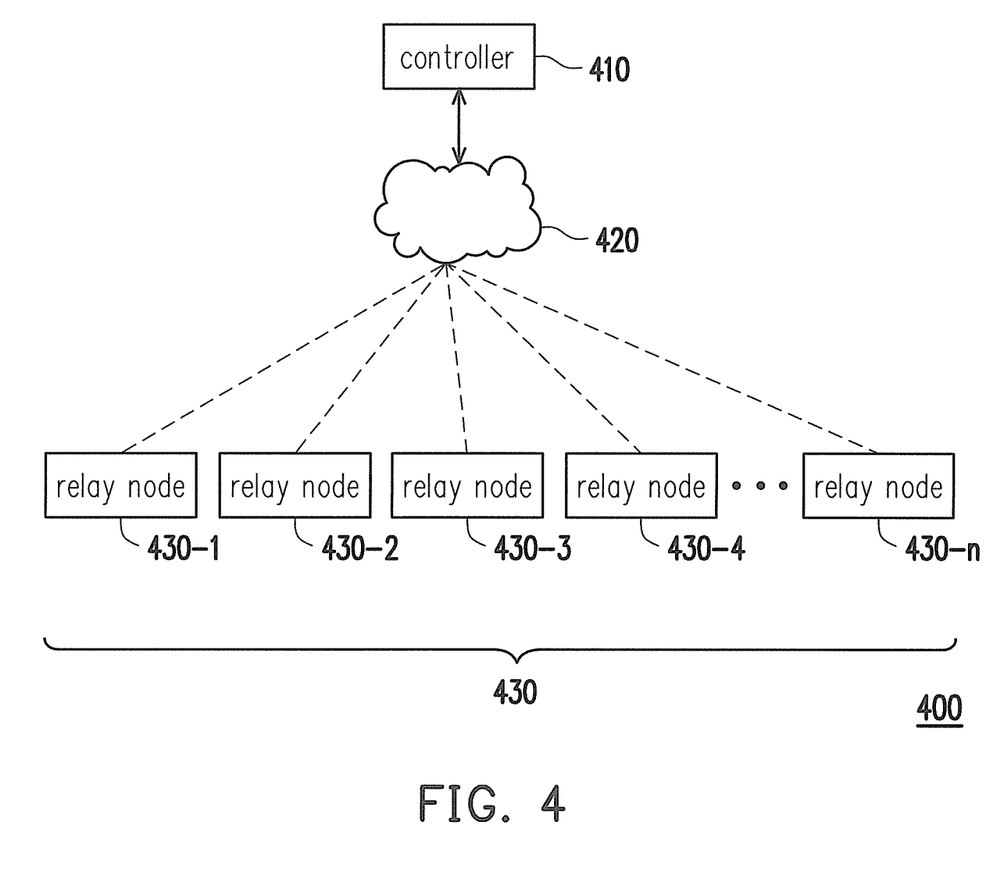
FIG. 4 is a block diagram illustrating a system for changing path according to a first exemplary embodiment of the present disclosure.

FIG. 4 is a block diagram illustrating a system for changing path according to a first exemplary embodiment of the present disclosure. It should be understood that, the example of FIG. 4 is merely used for illustrative convenience instead of limiting the present disclosure.

Referring to FIG. 4, a system 400 for changing path includes a controller 410 and a plurality of relay nodes 430. The relay nodes 430 include a relay node 430-1, a relay node 430-2 to a relay node 430-n, where n is a positive integer greater than 0.

The controller 410 is connected to the relay nodes 430 through a network 420. The controller 410 communicates with the relay node 430-1 to the relay node 430-n through the network 420 and a protocol, as so to set a plurality of flow tables on the relay nodes 430 and set the switches to transfer the packets of the data plane. The network 420 may be a software-defined network, but the present disclosure is not limited thereto. For example, in another exemplary embodiment, the network 420 may be any network capable of connecting the controller 410 to the relay nodes 430-1 to 430-n. Further, the controller 410 may be any type of control circuit, such as a system-on-chip (SOC), an application processor, a media processor, a microprocessor, a central processing unit (CPU), a digital signal processor or the like.

Specifically, each relay node among the relay nodes 430 is the network equipment. The network equipment may be the switch or the server device (e.g., a personal digital assistant, a notebook computer, a tablet computer and a general desktop computer). In the present exemplary embodiment, each relay node has a flow table of its own, and the flow table includes a plurality of flow entries (i.e., routing rules of the packets) for processing the packets. For instance, each flow entry is composed of items such as a matching field, an executing action, a priority sequence and so on. The matching field contains a source port of the packets and a header of the packets (e.g., a source IP address, a destination port number, a source MAC address, etc.). Each relay node compares the header of the packets and the source port thereof with the rules in the flow table. If one specific rule is matched, a corresponding action indicated by that specific rule is then executed (for example, the corresponding action includes transferring the packets to output port(s) of one or more relay nodes (e.g., the switches), modifying the header of the packet, transferring the packets to the controller, or sending the packets to another flow table for processing, etc.). If the packets match two or more of the routing rules in the same flow table, one of the rules with the higher priority sequence is first selected for execution. However, if none of the routing rules on the flow table is matched, the relay node inquires the controller about further instructions through the connection between the relay node and the controller. In the present exemplary embodiment, the controller 410 is, for example, a software-defined network controller, and the network 420 is, for example, the software-defined network. However, it should be understood that, in another embodiment, the network 420 may also be any network with a network architecture that separates the control plane from the data plane, and the controller 420 may be any controller of the control plane under such network architecture, which are not particularly limited in the present disclosure.

Figure 5:
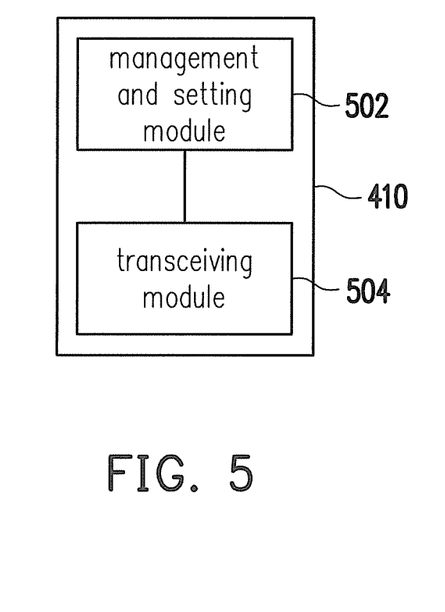
FIG. 5 is a block diagram illustrating the controller according to the first exemplary embodiment of the present disclosure.

FIG. 5 is a block diagram illustrating the controller according to the first exemplary embodiment of the present disclosure.

Referring to FIG. 5, the controller 410 includes a management and setting module 502 and a transceiving module 504. The management and setting module 502 is configured to change a transmission path of packets transmitted from one node to another node in a network. The transceiving module 504 is coupled to the management and setting module 502, and configured to receive and transmit packets and messages. It should be noted that, the management and setting module 502 and the transceiving module 504 in the present disclosure are implemented by software modules or program codes. For example, the controller 410 may include a processor circuit and a storage circuit (not illustrated) configured to store the management and setting module 502 and the transceiving module 504. Later, when the controller 410 is enabled, the software program codes are loaded from the storage circuit and executed by the processor circuit in order to perform functions of the management and setting module 502 and the transceiving module 504. However, the present disclosure is not limited thereto. For example, in another exemplary embodiment of the present disclosure, the management and setting module 502 and the transceiving module 504 may also be implemented by hardware circuits. For example, the management and setting module and the transceiving module may be implemented by the hardware circuits to become a management and setting circuit and a transceiving circuit.

Figure 6:
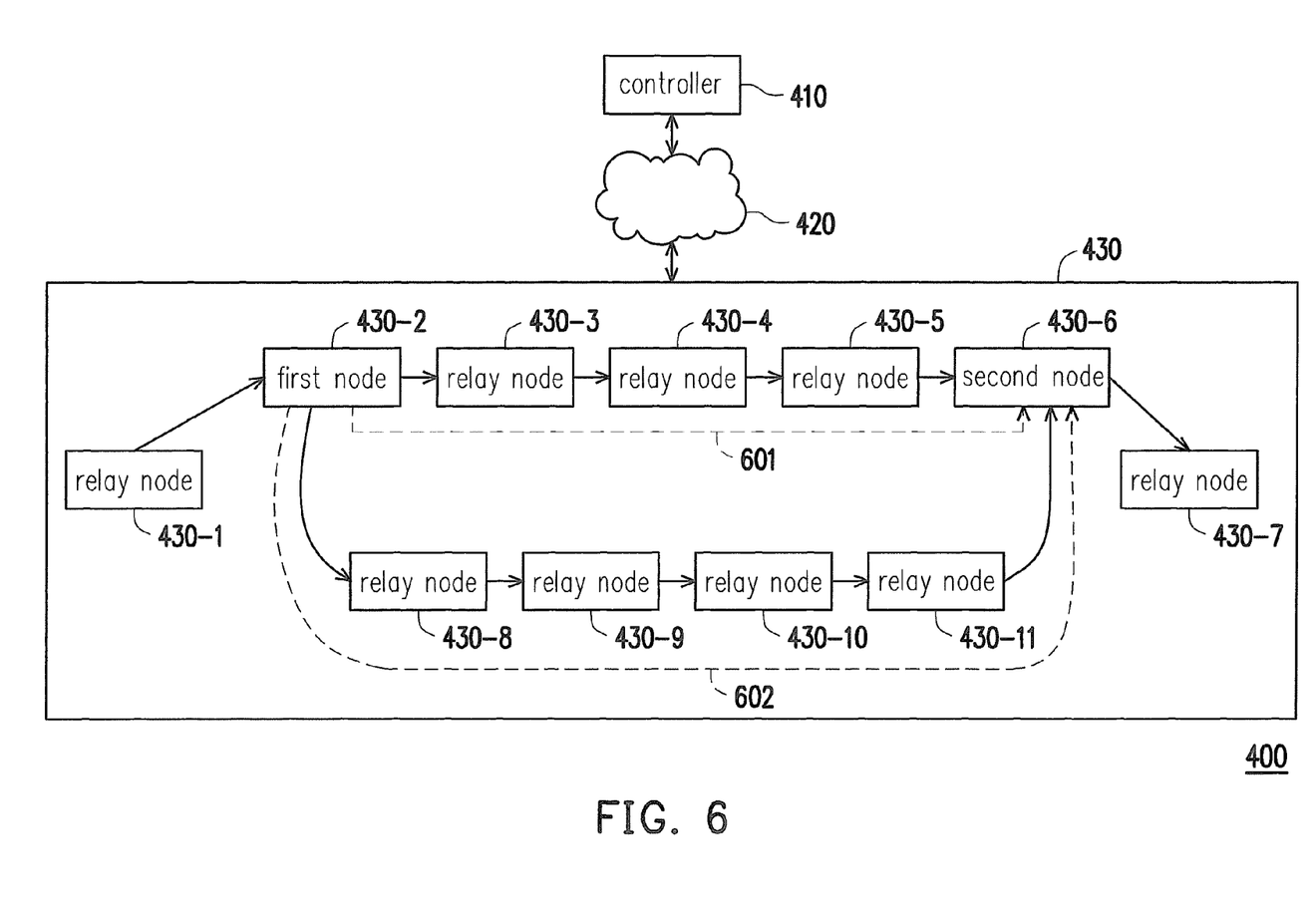
FIG. 6 is a schematic diagram illustrating the transmission path in the system for changing path according to an exemplary embodiment of the present disclosure.

FIG. 6 is a schematic diagram illustrating the transmission path in the system for changing path according to an exemplary embodiment of the present disclosure.

Referring to FIG. 6, a system 400 for changing path depicted in FIG. 6 is identical to the system 400 for changing path depicted in FIG. 4. In order to clearly describe operations of the controller 410, the management and setting module 502, the transceiving module 504 and the system 400 for changing path, an example is provided below with reference to the system 400 for changing path of FIG. 6.

In the present exemplary embodiment of the present disclosure, the controller 410 (or the management and setting module 502) is capable of changing the transmission path of the data packets according to the current network state. Herein, for illustrative convenience, it is assumed that among the relay nodes 430, a fork node which starts dividing the new and old transmission paths is a first node 430-2, and a rejoin node for rejoining the new and old transmission paths is a second node 430-6. Specifically, when the controller 410 (or the management and setting module 502) detects that the network state is in conditions of congestion or failure, the controller 410 (or the management and setting module 502) may change the transmission path of the packets from the first node 430-2 to the second node 430-6 in the network. For example, the controller 410 (or the management and setting module 502) may change the transmission path of the packets from a first transmission path 601 to a second transmission path 602.

Herein, it is assumed that, first data packets refer to the data packets in a data flow which are already transmitted from the first node 430-2 when the controller 410 (or the management and setting module 502) decides to change the transmission path of the data packets, and second data packets refer to the data packets in the data flow which are not yet transmitted from the first node 430-2 when the controller 410 (the management and setting module 502) decides to change the transmission path of the data packets. For example, a plurality of first data packets are transmitted from the first node 430-2 to the second node 430-6 by a plurality of relay nodes of the first transmission path 601 (i.e., a relay node 430-3, a relay node 430-4 and a relay node 430-5) according to the first transmission path 601. Specifically, when the controller 410 (or the management and setting module 502) decides to change the transmission path of the data packets, the controller 410 (or the management and setting module 502) may remove a flow entry corresponding to the first transmission path 601 on a flow table of the first node 430-2. In the present exemplary embodiment, by removing the flow entry corresponding to the first transmission path 601 on the flow table of the first node 430-2, the second data packets may be prevented from being transmitted according to the old path (i.e., the first transmission path 601).

Particularly, in the present exemplary embodiment, before the second data packets are transmitted from the first node 430-2 and after the flow entry corresponding to the first transmission path 601 on the flow table of the first node 430-2 is removed, the controller 410 (or the transceiving module 504) may transmit a flush packet to the first node 430-2, and the controller 410 (or the management and setting module 502) may set the flush packet to be transmitted to the second node 430-6 according to the first transmission path 601.

Because the flush packet is transmitted to second node 430-6 successively after the first data packets are transmitted to the second node 430-6, when the second node 430-6 receives such flush packet, it indicates that the first data packets have all been sent to the second node 430-6. Accordingly, the second node 430-6 sequentially transmits the first data packets from the second node 430-6 to the next relay node 430-7 according to the flow entry corresponding to the first transmission path 601 on the flow table of the second node 430-6.

In the present exemplary embodiment, when the second node 430-6 receives the flush packet, because none of the routing rules on the flow table of the second node 430-6 is matched by the flush packet, the second node 430-6 may transmit a packet inquiry message to the controller 410 (or the transceiving module 504). In other words, when the packet inquiry message corresponding to the flush packet from the second node 430-6 is received, the controller 410 (or the transceiving module 504) knows that the first data packets have all been sent to the next relay node 430-7 of the second node 430-6. Therefore, the controller 410 (or the management and setting module 502) may set a flow entry corresponding to the second transmission path 602 on flow tables of the second node 430-6 and relay nodes (i.e., a relay node 430-8, a relay node 430-9 and a relay node 430-11) of the second transmission path 602, and assign a port for transmitting the second data packets temporarily stored in the first node 430-2 from the first node 430-2 to the second node 430-6 by the relay nodes of the second transmission path 602 according to the second transmission path 602. It is worth mentioning that, the port assigned by the controller 410 (or the management and setting module 502) is an output port of a first relay node (i.e., the relay node 430-8) successively arranged after the first node 430-2 on the decided second transmission path 602. After the second data packets are transmitted to the second node 430-6, the second node 430-6 sequentially transmits the second data packets from the second node to the next relay node 430-7 according to the flow entry corresponding to the second transmission path 602 on the flow table of the second node 430-6.

It should be noted that, the flow entry on the flow table of the first node 430-2 has already been removed when the controller 410 (or the management and setting module 502) decides to change the transmission path of the data packets. Therefore, after the second data packets temporarily stored in the first node 430-2 are moved from the first node 430-2 to the output port of the assigned relay node 430-8, the controller 410 (or the management and setting module 502) may set the flow entry corresponding to the second transmission path 602 on the flow table of the first node 430-2, so that data packets of other data flows from other relay nodes (e.g., the relay node 430-1) may also be transmitted according to the second transmission path 602.

In the first exemplary embodiment, the flush packet is transmitted to the second node 430-6 only after the first data packets are transmitted to the second node 430-6. Therefore, in the present exemplary embodiment of the present disclosure, by determining whether the second node 430-6 has received the flush packet simply by using the packet inquiry message corresponding to the flush packet received by the controller 410, whether the first data packets on the old path (i.e., the first transmission path 601) before changing path have all been sent to the second node 430-6 may be then determined, so as to prevent the data packets loss on the old path. In addition, when the controller receives the packet inquiry message corresponding to the flush packet, it indicates that the first data packets have all been sent from the second node 460-6 to the next relay node 430-7. Thereafter, the controller 410 may continue to set the flow entry corresponding to the second transmission path 602 and transmit the second data packets. In other words, the second data packets are transmitted to the next relay node 430-7 only after the first data packets have all been sent to the next relay node 430-7 which is successively arranged after the second node 430-6. Accordingly, by sequentially transmitting the data packets on the new and old paths, the problem of the out-of-ordering packets on the new and old paths may be effectively prevented.

Figure 7:
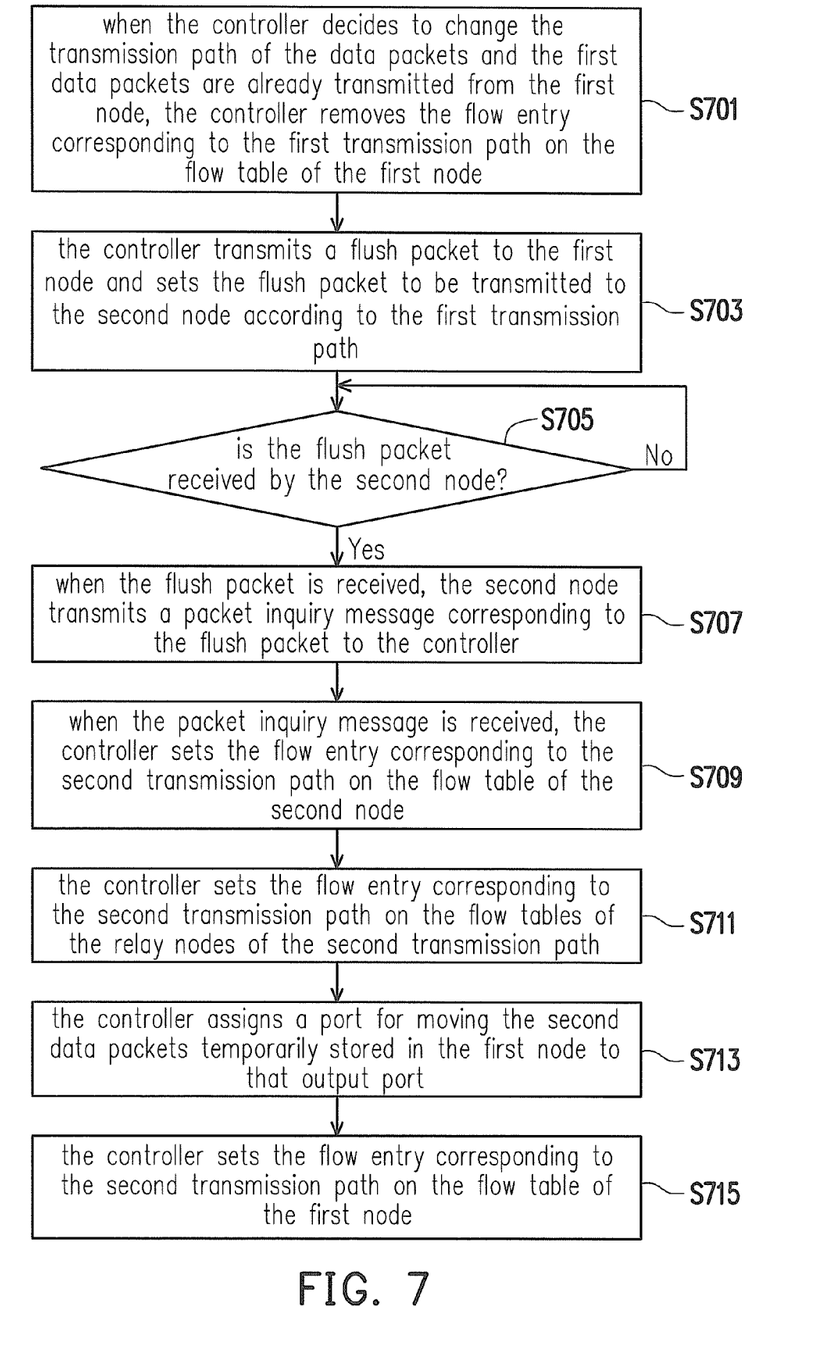
FIG. 7 is a flowchart illustrating a method for changing path according to the first exemplary embodiment of the present disclosure.

FIG. 7 is a flowchart illustrating a method for changing path according to the first exemplary embodiment of the present disclosure.

Referring to FIG. 7, in step S701, when the controller 410 decides to change the transmission path of the data packets and the first data packets are already transmitted from the first node 430-2, the controller 410 removes the flow entry corresponding to the first transmission path 601 on the flow table of the first node 430-2. In step S703, the controller 410 transmits a flush packet to the first node 430-2 and sets the flush packet to be transmitted to the second node 430-6 according to the first transmission path 601. Subsequently, in step S705, the second node 430-6 continues to receive the first data packets from the first transmission path 601 until the flush packet is received. In step S707, the second node 430-6 transmits a packet inquiry message corresponding to the flush packet to the controller 410. Otherwise, if the flush packet is not yet received, the second node 430-6 continues to receive the first data packets from the first transmission path 601 in step S705. In step S709, when the packet inquiry message is received, the controller 410 sets the flow entry corresponding to the second transmission path 602 on the flow table of the second node 430-6. Further, in step S711, the controller 410 sets the flow entry corresponding to the second transmission path 602 on the flow tables of the relay nodes of the second transmission path 602. Thereafter, in step S713, the controller 410 assigns a port for moving the second data packets temporarily stored in the first node 430-2 to that output port. Subsequently, in step S715, the controller 410 sets the flow entry corresponding to the second transmission path 602 on the flow table of the first node 430-2.

Steps depicted in FIG. 7 are described in detail as above, thus it is omitted hereinafter. It should be noted that, the steps depicted in FIG. 7 may be implemented as a plurality of program codes or circuits, and the present disclosure is not limited thereto. Moreover, the method disclosed in FIG. 7 may be used together with the foregoing embodiments, or may be used alone, and the present disclosure is not limited thereto.

Second Exemplary Embodiment

A method and a system for changing path of the second exemplary embodiment are essentially identical to the method and the system for changing path of the first exemplary embodiment, and a difference between the two is that the data packets before and after changing path are transmitted simultaneously in the second exemplary embodiment. The difference between the second exemplary embodiment and the first exemplary embodiment is described below by reference with the system and the reference numbers of the first exemplary embodiment.

Referring back to FIG. 6, in the present exemplary embodiment, when the controller 410 (or the management and setting module 502) decides to change the transmission path of the data packets, the controller 410 (or the management and setting module 502) may remove a flow entry corresponding to the first transmission path 601 on a flow table of the first node 430-2. Herein, by removing the flow entry corresponding to the first transmission path 601 on the flow table of the first node 430-2, the second data packets may be prevented from being transmitted according to the old path (i.e., the first transmission path 601).

In the present exemplary embodiment, before the second data packets are transmitted from the first node 430-2, the controller 410 (or the transceiving module 504) may transmit a flush packet to the first node 430-2, and the controller 410 (or the management and setting module 502) may set the flush packet to be transmitted to the second node 430-6 according to the first transmission path 601. Particularly, thereafter, the controller 410 (or the management and setting module 502) may set a flow entry corresponding to the second transmission path 602 on flow tables of relay nodes (i.e., the relay node 430-8, the relay node 430-9 and the relay node 430-11) of the second transmission path 602, and assign a port for transmitting the second data packets temporarily stored in the first node 430-2 from the first node 430-2 to the second node 430-6 by the relay nodes of the second transmission path 602 according to the second transmission path 602. Herein, the port assigned by the controller 410 (or the management and setting module 502) is an output port of a first relay node (i.e., the relay node 430-8) successively arranged after the first node 430-2 on the decided second transmission path 602. It should be noted that, the flow entry on the flow table of the first node 430-2 has already been removed when the controller 410 (or the management and setting module 502) decides to change the transmission path of the data packets. Therefore, after the second data packets are moved from the first node 430-2 to the output port of the assigned relay node 430-8, the controller 410 (or the management and setting module 502) may set the flow entry corresponding to the second transmission path 602 on the flow table of the first node 430-2, so that data packets of other data flows from other relay nodes (e.g., the relay node 430-1) may also be transmitted according to the second transmission path 602.

Specifically, at this time, a plurality of first data packets are transmitted from the first node 430-2 to the second node 430-6 by a plurality of relay nodes of the first transmission path 601 (i.e., the relay node 430-3, the relay node 430-4 and the relay node 430-5) according to the first transmission path 601. Further, after the flow entry corresponding to the second transmission path 602 is set on the flow tables of the relay nodes of the second transmission path 602 by the controller 410 (or the management and setting module 502), the second data packets are then transmitted from the first node 430-2 to the second node 430-6 by the relay nodes of the second transmission path 602 (i.e., the relay node 430-8, the relay node 430-9, the relay node 430-10 and the relay node 430-11) according to the second transmission path 602. In other words, the first data packets and the second data packets are simultaneously transmitted to the second node 430-6 respectively through the first transmission path 601 and the second transmission path 602.

In the present exemplary embodiment, the flush packet is successively transmitted to the second node 430-6 after the first data packets are transmitted to the second node 430-6. Therefore, when the second node 430-6 receives the flush packet, it indicates that the first data packets have all been sent to the second node 430-6. Accordingly, the second node 430-6 first transmits the first data packets from the second node 430-6 to the next relay node 430-7 according to the flow entry corresponding to the first transmission path 601 on the flow table of the second node 430-6. Subsequently, because none of the routing rules on the flow table of the second node 430-6 is matched by the flush packet, the second node 430-6 may transmit a packet inquiry message to the controller 410 (or the transceiving module 504). In other words, when the packet inquiry message corresponding to the flush packet from the second node 430-6 is received, the controller 410 (or the transceiving module 504) knows that the first data packets have all been sent to the next relay node 430-7 of the second node 430-6. Therefore, the controller 410 (or the management and setting module 502) may assign a port for sequentially transmitting the second data packets temporarily stored in the second node 430-6 from the second node 430-6 to the next relay node (i.e., the relay node 430-7).

Thereafter, the controller 410 (or the management and setting module 502) may set the flow entry corresponding to the second transmission path 602 on the flow table of the second node 430-6, so that data packets of other data flows from other relay nodes may also be transmitted according to the second transmission path 602.

In the second exemplary embodiment, the new and old data packets corresponding to the new and old paths (i.e., the first data packets and the second data packets) are simultaneously transmitted to the second node 430-6 respectively through the new and old paths (the first transmission path 601 and the second transmission path 602). The flush packet is transmitted to the second node 430-6 immediately after the first data packets are transmitted to the second node 430-6. Therefore, when the packet inquiry message corresponding to the flush packet is received, the controller 410 knows that the first data packets on the old path (i.e., the first transmission path 601) before changing path have all been sent from the second node 430-6 to the next relay node 430-7, so as to prevent the data packets loss on the old path. In addition, when the controller 410 receives the packet inquiry message corresponding to the flush packet, it indicates that the first data packets have all been sent from the second node 460-6 to the next relay node 430-7. Accordingly, the controller 410 may further sequentially transmits the second data packets at the second node to the next relay node 430-7, so as to effectively prevent the problem of the out-of-ordering packets on the new and old paths. Particularly, other than effectively solving aforementioned problems by simultaneously transmitting the data packets on the new and old paths, performances for processing and transmitting the data packets in the network may also be improved by parallel processing the data packets on the new and old paths.

Figure 8:
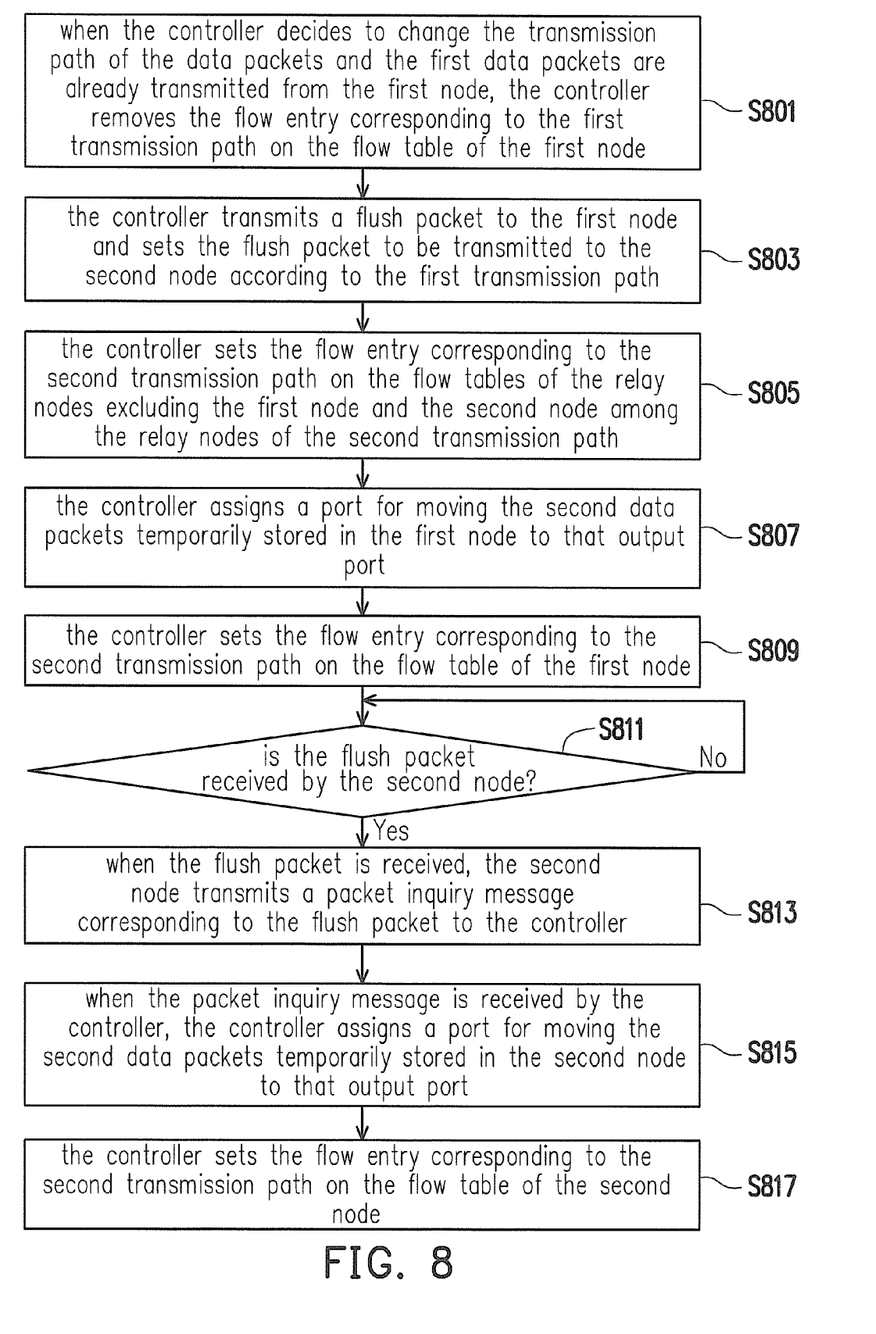
FIG. 8 is a flowchart illustrating a method for changing path according to a second exemplary embodiment of the present disclosure.

FIG. 8 is a flowchart illustrating a method for changing path according to a second exemplary embodiment of the present disclosure.

Referring to FIG. 8, in step S801, when the controller 410 decides to change the transmission path of the data packets and the first data packets are already transmitted from the first node 430-2, the controller 410 may remove the flow entry corresponding to the first transmission path 601 on the flow table of the first node 430-2. In step S803, the controller 410 transmits a flush packet to the first node 430-2 and sets the flush packet to be transmitted to the second node 430-6 according to the first transmission path 601. Further, in step S805, the controller 410 sets the flow entry corresponding to the second transmission path 602 on the flow tables of the relay nodes excluding the first node and the second node among the relay nodes of the second transmission path 602. Thereafter, in step S807, the controller 410 assigns a port for moving the second data packets temporarily stored in the first node 430-2 to that output port. Subsequently, in step S809, the controller 410 sets the flow entry corresponding to the second transmission path 602 on the flow table of the first node 430-2. In step S811, the second node 430-6 continues to receive the first data packets from the first transmission path 601 and the second data packets from the second transmission path 602 until the flush packet is received. In step S813, the second node 430-6 transmits a packet inquiry message corresponding to the flush packet to the controller 410. Otherwise, if the flush packet is not yet received, the second node 430-6 continues to receive the data packets from the first transmission path 601 and the second transmission path 602 in step S811. In step S815, when the packet inquiry message is received, the controller 410 assigns a port for moving the second data packets temporarily stored in the second node 430-6 to that output port. Subsequently, in step S817, the controller 410 sets the flow entry corresponding to the second transmission path 602 on the flow table of the second node 430-6.

Nevertheless, steps depicted in FIG. 8 are described in detail as above, thus related description is omitted hereinafter. It should be noted that, the steps depicted in FIG. 8 may be implemented as a plurality of program codes or circuits, and the present disclosure is not limited thereto. Moreover, the method disclosed in FIG. 8 may be used together with the foregoing embodiments, or may be used alone, and the present disclosure is not limited thereto.

In summary, in the method for changing path according to the exemplary embodiments of the present disclosure and the system and the controller using the method, a specific flush packet is used to prevent the data packets changed to the new path from remaining on the path, so as to effectively preventing the problem of the packet loss on the old path and the problem of the out-of-ordering packets on the new and old paths. In addition, by using the method and the system for changing path and the controller thereof according to the present disclosure, when the network state is in conditions of congestion or failure, the congestion control of TCP at back end will not be triggered to reduce the window size for transmitting packets or activate the packets-retransmitting mechanism. Accordingly, performance for processing and transmitting the data packets in the entire network may be effectively improved.

It will be apparent to those skilled in the art that various modifications and variations can be made to the disclosed embodiments. It is intended that the specification and examples be considered as exemplary only, with a true scope of the disclosure being indicated by the following claims and their equivalents

What is claimed is:

1. A method for changing a transmission path of packets transmitted from a first node to a second node in a network, the method comprising:
    after a plurality of first data packets intended to be transmitted to the second node are transmitted from the first node by a plurality of relay nodes of a first transmission path according to the first transmission path, removing a flow entry corresponding to the first transmission path on a flow table of the first node by a controller, wherein the network has a control plane and a data plane, and the controller is disposed in the control plane;
    transmitting a flush packet to the first node and setting the flush packet to be transmitted to the second node according to the first transmission path by the controller; and
    when the second node receives the flush packet and transmits a packet inquiry message corresponding to the flush packet to the controller, setting a flow entry corresponding to a second transmission path on a flow table of the second node by the controller.

2. The method according to claim 1, further comprising:
    when the second node receives the flush packet and transmits the packet inquiry message corresponding to the flush packet to the controller, setting the flow entry corresponding to the second transmission path on flow tables of a plurality of relay nodes of the second transmission path by the controller, assigning a port for transmitting a plurality of second data packets temporarily stored in the first node from the first node to the second node by the relay nodes of the second transmission path according to the second transmission path by the controller, and setting the flow entry corresponding to the second transmission path on the flow table of the first node by the controller.

3. The method according to claim 1, further comprising:
    before setting the flow entry corresponding to the second transmission path on the flow table of the second node, sequentially transmitting the first data packets from the second node to the next relay node according to the flow entry corresponding to the first transmission path on the flow table of the second node.

4. The method according to claim 2, further comprising:
    after setting the flow entry corresponding to the second transmission path on the flow table of the second node, sequentially transmitting the second data packets from the second node to the next relay node according to the flow entry corresponding to the second transmission path on the flow table of the second node.

5. The method according to claim 1, further comprising:
    after transmitting the flush packet to the first node and setting the flush packet to be transmitted to the second node according to the first transmission path, setting the flow entry corresponding to the second transmission path on flow tables of a plurality of relay nodes of the second transmission path by the controller, assigning a port for transmitting a plurality of second data packets temporarily stored in the first node from the first node to the second node by the relay nodes of the second transmission path according to the second transmission path by the controller, and setting the flow entry corresponding to the second transmission path on the flow table of the first node by the controller.

6. The method according to claim 5, further comprising: before setting the flow entry corresponding to the second transmission path on the flow table of the second node, assigning a port for sequentially transmitting the second data packets temporarily stored in the second node from the second node to the next relay node.

7. The method according to claim 1, wherein the network is a software-defined networking.

8. A controller, comprising:
a management and setting module changing a transmission path of packets transmitted from a first node to a second node in a network, and
a transceiving module, coupled to the management and setting module, wherein the transceiving module to receives and transmits packets and messages,
wherein after a plurality of first data packets intended to be transmitted to the second node are transmitted from the first node by a plurality of relay nodes of a first transmission path according to the first transmission path, the management and setting module further removes a flow entry corresponding to the first transmission path on a flow table of the first node, wherein the network has a control plane and a data plane, and the controller is disposed in the control plane,
wherein the transceiving module transmits a flush packet to the first node and the management and setting module is further configured to set the flush packet to be transmitted to the second node according to the first transmission path,
wherein when the transceiving module receives a packet inquiry message corresponding to the flush packet from the second node, the management and setting module further sets a flow entry corresponding to a second transmission path on a flow table of the second node.

9. The controller according to claim 8, wherein when the transceiving module receives the packet inquiry message corresponding to the flush packet from the second node, the management and setting module further sets the flow entry corresponding to the second transmission path on flow tables of a plurality of relay nodes of the second transmission path, assigns a port for transmitting a plurality of second data packets temporarily stored in the first node from the first node to the second node by the relay nodes of the second transmission path according to the second transmission path, and sets the flow entry corresponding to the second transmission path on the flow table of the first node.

10. The controller according to claim 8, wherein after the transceiving module transmits the flush packet to the first node and the management and setting module sets the flush packet to be transmitted to the second node according to the first transmission path, the management and setting module further sets the flow entry corresponding to the second transmission path on flow tables of a plurality of relay nodes of the second transmission path, assigns a port for transmitting a plurality of second data packets temporarily stored in the first node from the first node to the second node by the relay nodes of the second transmission path according to the second transmission path, and sets the flow entry corresponding to the second transmission path on the flow table of the first node.

11. The controller according to claim 10, wherein before the management and setting module sets the flow entry corresponding to the second transmission path on the flow table of the second node, the management and setting module further assigns a port for sequentially transmitting the second data packets temporarily stored in the second node from the second node to the next relay node.

12. The controller according to claim 8, wherein the network is a software-defined networking.

13. A system, comprising:
a plurality of relay nodes; and
a controller, changing a transmission path of packets transmitted from a first node to a second node in a network, wherein the first node and the second node each belongs to one of the relay nodes,
wherein after a plurality of first data packets intended to be transmitted to the second node are transmitted from the first node via relay nodes of a first transmission path among the relay nodes according to the first transmission path, the controller removes a flow entry corresponding to the first transmission path on a flow table of the first node, wherein the network has a control plane and a data plane, and the controller is disposed in the control plane,
wherein the controller further transmits a flush packet to the first node, and set the flush packet to be transmitted to the second node according to the first transmission path,
wherein when the controller receives a packet inquiry message corresponding to the flush packet from the second node, the controller further sets a flow entry corresponding to a second transmission path on a flow table of the second node.

14. The system according to claim 13, wherein when the controller receives the packet inquiry message corresponding to the flush packet from the second node, the controller further sets the flow entry corresponding to the second transmission path on flow tables of a plurality of relay nodes of the second transmission path, assigns a port for transmitting a plurality of second data packets temporarily stored in the first node from the first node to the second node by the relay nodes of the second transmission path according to the second transmission path, and sets the flow entry corresponding to the second transmission path on the flow table of the first node.

15. The system according to claim 13, wherein before the controller sets the flow entry corresponding to the second transmission path on the flow table of the second node, the second node sequentially transmits the first data packets from the second node to the next relay node according to the flow entry corresponding to the first transmission path on the flow table of the second node.

16. The system according to claim 14, wherein after the controller sets the flow entry corresponding to the second transmission path on the flow table of the second node, the second node sequentially transmits the second data packets from the second node to the next relay node according to the flow entry corresponding to the second transmission path on the flow table of the second node.

17. The system according to claim 13, wherein after the controller transmits the flush packet to the first node and sets the flush packet to be transmitted to the second node according to the first transmission path, the controller further sets the flow entry corresponding to the second transmission path on flow tables of a plurality of relay nodes of the second transmission path, assigns a port for transmitting a plurality of second data packets temporarily stored in the first node from the first node to the second node by the relay nodes of the second transmission path according to the second transmission path, and sets the flow entry corresponding to the second transmission path on the flow table of the first node.

18. The system according to claim 17, wherein before the controller sets the flow entry corresponding to the second transmission path on the flow table of the second node, the controller further assigns a port for sequentially transmitting the second data packets temporarily stored in the second node from the second node to the next relay node.

19. The system according to claim 13, wherein the network is a software-defined networking.

* * * * *